(12) United States Patent
Rothman et al.

(10) Patent No.: US 8,561,138 B2
(45) Date of Patent: Oct. 15, 2013

(54) SYSTEM AND METHOD TO PROVIDE ADDED SECURITY TO A PLATFORM USING LOCALITY-BASED DATA

(75) Inventors: Michael M. Rothman, Puyallup, WA (US); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 12/347,830

(22) Filed: Dec. 31, 2008

(65) Prior Publication Data

US 2010/0169949 A1 Jul. 1, 2010

(51) Int. Cl.
*G06F 21/00* (2013.01)

(52) U.S. Cl.
USPC .......... 726/2; 726/1; 726/3; 726/4; 726/5; 726/6; 726/7; 726/16; 726/17; 726/19; 726/21; 726/26; 726/27; 726/30; 726/34; 726/35; 726/36; 455/456.1; 455/456.2; 455/456.3; 455/456.4; 455/456.5; 455/456.6

(58) Field of Classification Search
USPC .............. 726/1–10, 16–21, 34–36, 26–30; 455/456.1–456.6
See application file for complete search history.

(56) References Cited

U.S. PATENT DOCUMENTS

| | | | | |
|---|---|---|---|---|
| 5,423,037 | A * | 6/1995 | Hvasshovd | 1/1 |
| 6,744,892 | B2 * | 6/2004 | Akins et al. | 380/241 |
| 6,954,147 | B1 | 10/2005 | Cromer et al. | |
| 7,218,941 | B1 * | 5/2007 | Kubo et al. | 455/456.6 |
| 7,366,551 | B1 * | 4/2008 | Hartley | 455/575.1 |
| 7,472,208 | B2 | 12/2008 | Rothman et al. | |
| 7,877,798 | B2 * | 1/2011 | Saunders et al. | 726/20 |
| 7,941,612 | B2 * | 5/2011 | Shin et al. | 711/147 |
| 2003/0097590 | A1 * | 5/2003 | Syvanne | 713/201 |
| 2005/0044424 | A1 * | 2/2005 | Xydis | 713/201 |
| 2005/0101283 | A1 | 5/2005 | Kimata | |
| 2006/0075487 | A1 * | 4/2006 | Pfleging et al. | 726/21 |
| 2006/0095389 | A1 | 5/2006 | Hirota et al. | |
| 2007/0079141 | A1 | 4/2007 | Iwaki | |
| 2008/0256648 | A1 * | 10/2008 | Piccionelli et al. | 726/35 |
| 2009/0291713 | A1 | 11/2009 | Tsukamoto et al. | |

FOREIGN PATENT DOCUMENTS

| | | |
|---|---|---|
| EP | 1643407 A1 | 4/2006 |
| JP | 2005142981 A | 6/2005 |
| JP | 2006099769 A | 4/2006 |
| JP | 2006127293 A | 5/2006 |
| JP | 2007102363 A | 4/2007 |
| JP | 2007214898 A | 8/2007 |

(Continued)

OTHER PUBLICATIONS

Location Determination of a Mobile Device Using IEEE 802.11b Access Point Signals by Saha et al; Publisher: IEEE; Year 2003.*

(Continued)

*Primary Examiner* — Madhuri Herzog
(74) *Attorney, Agent, or Firm* — Barnes & Thornburg LLP

(57) ABSTRACT

In some embodiments, the invention involves protecting a platform using locality-based data and, more specifically, to using the locality-based data to ensure that the platform has not been stolen or subject to unauthorized access. In some embodiments, a second level of security, such as a key fob, badge or other source device having an identifying RFID is used for added security. Other embodiments are described and claimed.

40 Claims, 4 Drawing Sheets

(56) References Cited

FOREIGN PATENT DOCUMENTS

| JP | 2007257066 A | 10/2007 |
|----|--------------|---------|
| WO | 2008018328 A1 | 2/2008 |
| WO | 2008/034944 A1 | 3/2008 |
| WO | 2008034944 A1 | 3/2008 |

OTHER PUBLICATIONS

Extended Search Report received for Europen Patent Application No. 09252906.4, mailed on Apr. 8, 2010, 6 pages.
Office Action Recieved for Korean Patent Application No. 10-2009-0131236 Mailed on Mar. 18, 2011, 3 pages of English translation only.
Office Action received in Chinese Patent Application No. 200911000240.7, mailed Sep. 21, 2011, 22 pages of Office Action, including 12 pages of unofficial English translation.
Official Communication received in European Patent Application No. 09252906.4, mailed Jul. 19, 2010, 2 pages.
Office Action received in Japanese Patent Application No. 2009-291095, mailed Mar. 13, 2012, 8 pages of Office Action, including 4 pages of unofficial English translation.
Office Action received in Korean Patent Application No. 2009-0131236, mailed Nov. 30, 2011, 2 pages of unofficial English translation only.
Office Action received for Chinese Patent App. No. 200911000240.7, mailed Feb. 21, 2012, 11 pages of Chinese Office Action and 12 pages of unofficial English translation.
Office Action received for Chinese Patent App. No. 200911000240.7, mailed May 28, 2012, 10 pages of Chinese Office Action and 11 pages of unofficial English translation.
Office Action recieved for Japanese Patent App. No. 2009-0131236, mailed Jul. 24, 2012, 3 pages of Japanese Office Action and 3 pages of unofficial English translation.
Official Communication received for European Patent App. No. 09252906.4, mailed Aug. 13, 2012, 5 pages.
Office Action received for Chinese Patent Application No. 200911000240.7, mailed Aug. 29, 2012, 13 pages of Chinese Office Action and 15 pages of unofficial English translation.
Notice of Allowance receive in the Korean Patent Application No. 10-2009-0131236, mailed Aug. 30, 2012, 3 pages, including 1 pages of English translation.
Office Action received for Chinese Patent Application No. 200911000240.7, mailed Nov. 30, 2012, 13 pages of Chinese Office Action and 17 pages of unofficial English translation.
Office Action received for Chinese Patent Application No. 200911000240.7, mailed May 13, 2013, 14 pages of Chinese Office Action and 17 pages of unofficial English translation.

* cited by examiner

Basic Logic for Locality Sensor

```
201   If (Power_L > Threshold && IDCorrect)        Allow Normal Operation
203   If (Power_L > Threshold && !IDCorrect && Pre-Boot)   Do Not Allow Boot
205   If (Power_L > Threshold && !IDCorrect && !Pre-Boot)  Force Session Lock-up/Screensaver
207   If (Power_L < Threshold && Pre-Boot)         Do Not Allow Boot
209   If (Power_L < Threshold && !Pre-Boot)        Force Session Lock-up/Screensaver
```

*Fig. 2*

Eq. 200 $$Power_r = \frac{Power_t * Gain_r * Gain_t * \lambda^2}{(4\pi R)^2}$$

*Fig. 3*

SYSTEM AND METHOD TO PROVIDE ADDED SECURITY TO A PLATFORM USING LOCALITY-BASED DATA

FIELD OF THE INVENTION

An embodiment of the present invention relates generally to protecting a platform using locality-based data and, more specifically, to using the locality-based data to ensure that the platform has not been stolen or subject to unauthorized access. In some embodiments, a second level of security, such as a key fob is used for added security.

BACKGROUND INFORMATION

Various mechanisms exist for protecting mobile computing devices from theft or unauthorized access. Password protection for both hard drives and operating system login are typically used in existing systems. Even though existing platforms are cloaked in the protection of having power-on passwords, screen saver passwords, and network login challenges, one does not have the ability to protect the platform from unintentional lapses of user judgment. Passwords may be stolen or captured, allowing unauthorized persons access to a device. Examples of judgment lapse can be associated with the theft of an unattended laptop, or the user not choosing to employ reasonable password safeguards.

BRIEF DESCRIPTION OF THE DRAWINGS

The features and advantages of the present invention will become apparent from the following detailed description of the present invention in which:

FIG. 2 illustrates basic logic for a locality sensor, according to an embodiment of the invention;

FIG. 3 shows an exemplary equation for calculating Power$_r$, according to an embodiment of the invention;

DETAILED DESCRIPTION

An embodiment of the present invention is a system and method relating to protecting a platform from unauthorized access or usage using locality-based data. For platforms that are established as "connected" devices, these devices may be tuned to both the presence of a familiar network as well as the presence of an authorized user via setting of policy variables. In the case where any of these policy variables are not met, an alternate boot path may be initiated (during power-on). If the platform is already running with the operating system (OS) launched, the platform may immediately enter a "lock-down" mode when the policy variables become dictate unauthorized usage. Examples of these situations might be when a platform does not detect a familiar network, physical intrusion has been detected, or in locality-enabled platforms the platform is not in the presence of the appropriate radio frequency (RF) transponder or RFID (RF identifier).

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

With the advent of platform components which promote remote platform manageability, for instance, using manageability initiatives available from Intel Corporation such as the Intel® Active Management Technology (IAMT), one can leverage the out-of-band nature of the communication environment to alert the administration that a potential security breach is at hand. For more information on IAMT, see the public Internet URL www\*intel\*.com/technology/manage/iamt/ where URLs in this document have periods replaced with asterisks to avoid inadvertent hyperlinks.

Figure 1:
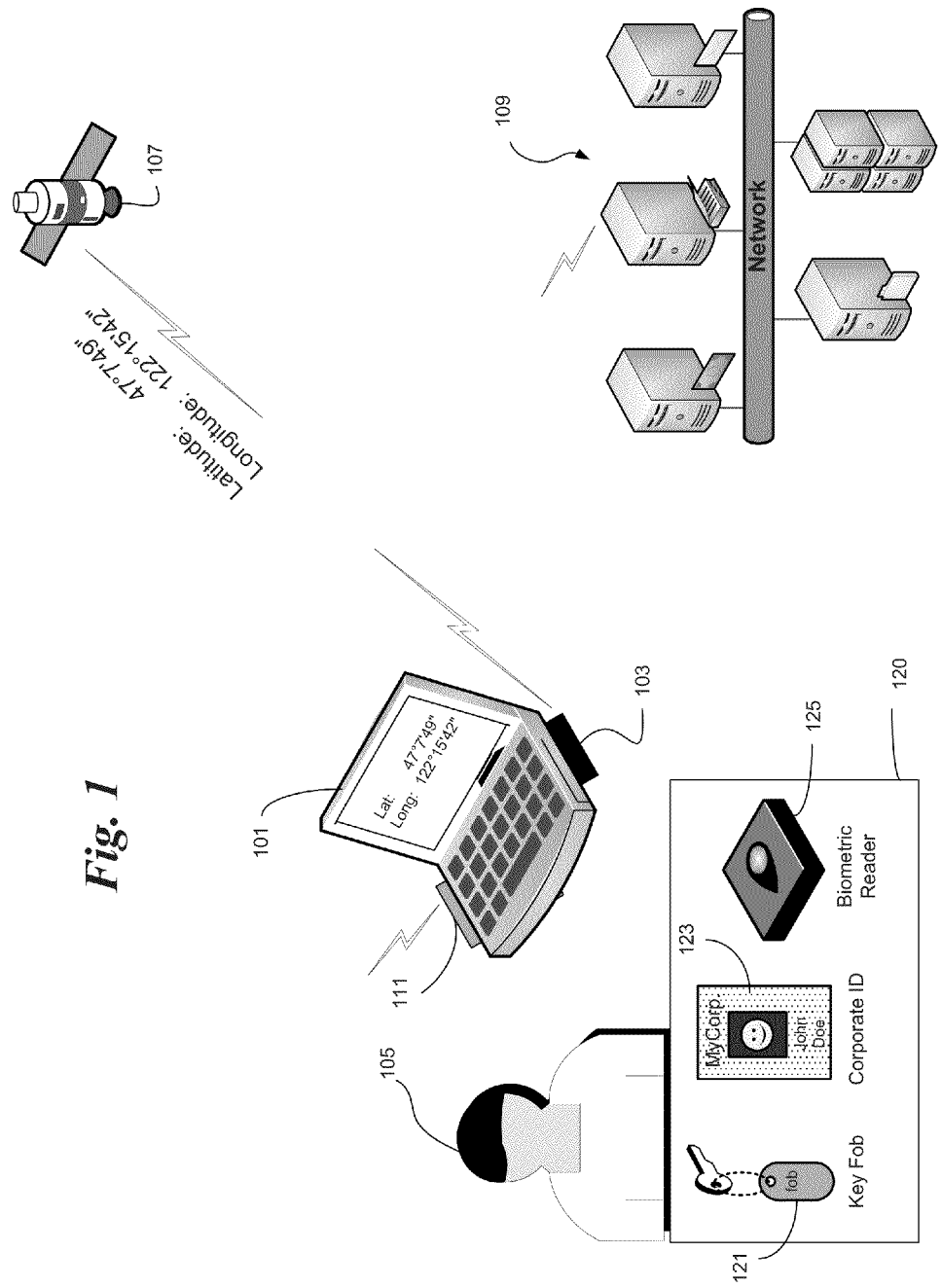
FIG. 1 is a block diagram illustrating a very high level system having a platform with locality-based components, according to an embodiment of the invention.

FIG. 1 is a block diagram illustrating a very high level system having a platform with locality-based components, according to an embodiment of the invention. In an embodiment, a platform 101 is coupled to an RF device 103. The RF device may be configured to receive location information from a global positioning satellite (GPS) system 107. In another embodiment, for instance where a platform is located inside a secure building, it may be important that the platform be used in only a subset of rooms within the building. Therefore, location is still important. In this case, the RF device 103 may communicate with a more localized positioning device located within the building (not shown), and having a more limited range than a satellite 107. In any case, the RF device 103 receives location-based information from a positioning device.

In an embodiment, the platform 101 may detect whether it is within range or connected to a known network 109. A mechanism may ensure that the platform is booting in the presence of the known network 109; the lack of such a known/familiar environment facilitates the platform 101 to boot to an alternate boot path which may require added user 105 verification.

In an embodiment, the platform 101 may be equipped with a manageability engine, or microprocessor capable of out-of-band communication 111, such as with the Intel® Active Management Technology (IAMT). This out-of-band network connectivity may alert a remote authority of a potential security issue associated with a system that is attempting to be booted without authorization.

By using platform-based heuristics (e.g., intrusion detection without password confirmation, locality-based operation, etc.) the platform 101 may alter its behavior to automatically launch alternate boot paths to prevent the use of the platform, as well as, potentially alert a central authority that the platform has been used in a non-authorized manner. The heuristics may include detection of the network 109; location from a positioning source 107; or a security device 120 with an RFID, such as a key fob 121 or badge 123, or a biometric reader 125 to detect an authorized user. Other passive or active security devices may be used. Platform policy dictates which alternate boot path to initiate and whether an alert is to be sent, or a user challenge is to be performed, based on the detected parameters.

Embodiments of the present invention differ from existing systems in that they do not simply rely upon a shared secret, such as a pass-phrase, that may be forgotten. The use of a locality information such as a familiar network or some RFID data such as one embedded in one's corporate badge, for example, is something that most users do not need to think about or must carry in order to enter the physical premises, for example.

Using relatively low-cost technology such as an RF transceiver, the presence of a security device (e.g. an object such as corporate badge or Key fob with an RFID, etc.) may be detected. The platform policy dictates that a service continuously run on the platform to detect the security device and verify that the object is within the proximity of the transceiver to authorize use of the given system. This object sensing also enables the platform to detect when the authorized user has left the transceiver's radius of detection, or is outside of a range threshold. When the proximity test fails, the service may automatically lock the platform from use.

This same solution can apply to various types of platforms. For mobile systems, a common scenario is that a laptop is stolen (e.g. from a car, airport, etc.), but when the thief attempts to use the system it will not boot due to the lack of an appropriate proximity response identification. For desktop systems, platform policy may dictate that a user be authorized operate a computer in the user's cubicle or office, or in a traveler's workstation area, but not be authorized to operate a computer in another user's work area. For a server, a more complex scenario may be desired. For instance, two stages of IDs may be utilized: one being an attendant's ID which allows the server to be manipulated locally (e.g. keyboard interaction, etc), while a secondary ID residing in the room itself may allow the server to operate normally. In the first server ID example, if the attendant walks away the server may lock up automatically and prohibit user input, but remain otherwise operational. Another policy may cause the server to re-boot to another boot path when the attendant leaves proximity. In the second ID example, the server might halt operation if it detects that it has been moved to an unauthorized location.

FIG. 2 illustrates basic logic for a locality sensor, according to an embodiment of the invention. Other platform policies may be used based on a desired effect of potential security problems. In this logic, $Power_r$ represents the detected strength or power of the security device or distance/locality threshold. For instance, if a key fob is detected within a pre-determined range of the platform then the $Power_r$ will be greater than the threshold. In some embodiments, the $Power_r$ indicates that the platform is within a certain range of a specified location.

In an embodiment, if the $Power_r$ is greater than the threshold and an identifier is correct, for instance an identifier on a badge or key fob, then normal operation is permitted, as shown in line 201. If the $Power_r$ is greater than the threshold and an identifier is not correct, for instance an unauthorized identifier on a badge or key fob, or lack thereof, and the platform is attempting to boot, then boot may be prohibited, or permitted only for an alternate boot path, as shown in line 203. If the $Power_r$ is greater than the threshold and an identifier is not correct, and the platform is not in a pre-boot phase, then policy may dictate that the session is to be locked-up, e.g., no user input or output enabled, or forced to run a screensaver as shown in line 205. In some cases, a shutdown may be performed.

In cases where the $Power_r$ is less than the threshold, e.g., out of range or in an unauthorized location, and the platform is attempting pre-boot phase, policy may dictate that the platform is prohibited from booting, as shown in line 207. If the $Power_r$ is less than the threshold, e.g., out of range or in an unauthorized location, and the platform is not in a pre-boot phase, then policy may dictate that the session is to be locked-up, e.g., no user input or output enabled, or forced to run a screensaver as shown in line 209. In some cases, a shutdown may be preformed.

FIG. 3 shows an exemplary equation for calculating $Power_r$, according to an embodiment of the invention. Equation 200 is a common equation to calculate the power being received by multiplying the Power/Gain/Wavelength (lambda) and dividing that by $(4*Pi*radius)^2$. This equation is often used to determine distance of an object. Thus, it is applied to determine if a device is within a particular radius of a machine.

Figure 4:
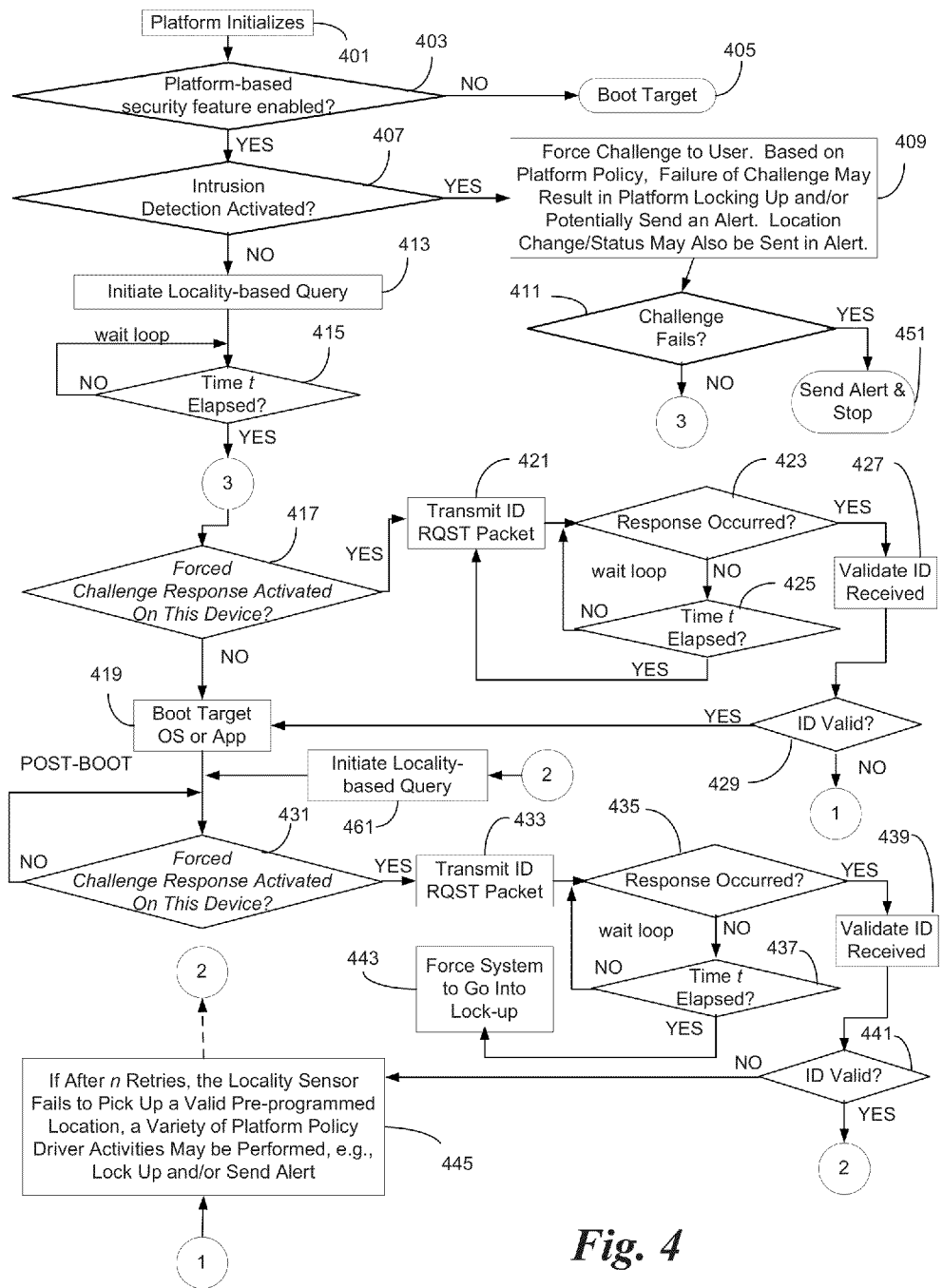
FIG. 4 is a flow diagram showing an exemplary method for using locality-based information to safeguard a platform, according to an embodiment of the invention.

FIG. 4 is a flow diagram showing an exemplary method for using locality-based information to safeguard a platform, according to an embodiment of the invention. During the boot process, the platform begins to initialize, in block 401. The point during boot at which the policy engine is run may vary, as long as the process is run before operating system (OS) launch. In other words, this process discussed below may be run by the firmware, or BIOS, before OS launch. A determination is made as to whether the platform has the locality-based security enabled, in block 403. If the security feature is not enabled, then the platform boots to target, as normal, in block 405.

When the security feature is enabled, a determination is made as to whether an intrusion detection is activated, in block 407. A detected intrusion is typically when a platform chassis is opened and/or some hardware change has been made to the platform since the last boot. Detecting when a chassis has been opened is known in the art. If an intrusion of this sort has been detected, a challenge may be forced on the user to ensure that the user is authorized, in block 409. It is determined whether the challenge fails in block 411. Based on platform policy, a failure of the challenge may result in the platform locking up and/or potentially sending an alert via an out-of-band communication, and the platform will not boot, in block 451. A location change or status may also be sent in the alert. If the challenge succeeds, then the platform may be allowed to boot and continue at block 417.

For instance, if someone steals the platform and attempts to circumvent security measures by opening the chassis and altering the hardware, as long as the firmware is intact, embodiments of the invention may still protect the device from unauthorized usage. When the thief attempts to boot the platform, a challenge will be forced. One challenge might be a simple password requirement. Another more passive challenge may be to determine whether a known network is in range, or whether the platform is within range of an authorized location. If the challenges fail, the system will not boot and the thief's attempt at access will fail. The required challenge may vary based on platform policy.

In some embodiments, the platform may connect to a network during boot. When a network is available, the firmware may send an alert message to appropriate authorities describing the security breach. If the platform is able to ascertain its location, this information may be sent in the alert. In an embodiment, this communication may be possible using a manageability engine, or IAMT network connection. In another embodiment, the host network driver has been launched and the alert is sent via the host processor network connection.

If no intrusion has been detected in block 407, a locality-base query may be initiated in block 413. A query may be sent to a positioning device, such as a GPS system 107, or a local device (not shown). The location of the platform may be returned in a variety of formats to the platform. It will be understood that there may be a delay in receiving location-based information from the positioning device. Thus, in embodiments, a timer t may be set so that a loop may be initiated to wait for a response, in block 415. Once the time has elapsed, and the location-based information is received, processing continues at block 417.

A determination is made as to whether the forced challenge response security is enabled on the platform, in block 417. If this security measure is not enabled, the boot target may launch the OS or application in block 419. If the security measures are, enabled, then processing continues with block 421. In an embodiment, each platform has a unique identifier that is known to the authorized network. The platform identifier may be transmitted to the network with a request packet in block 421. The request packet may merely be for the network to respond. If a response occurs as determined in block 423, then the network server may validate the ID in block 427. If the ID is valid, as determined in block 429, then the boot target may executed to launch the OS or application, in block 419.

As long as no response is received for a threshold time t, as determined in block 425, the process loops back to block 423 to wait for a response. If there is no response in time t, then the ID request may be sent again, in block 421.

Once the platform has booted in block 419, it is still possible for the platform to be moved from an authorized location, or be stolen, for instance, while in stand-by or hibernate mode—or even while running. Thus, runtime security may be enabled. A determination is made as to whether the forced challenge response security measure is enabled, in block 431, during runtime. This check may be performed on a periodic basis, as determined by platform policy. If the security feature is not enabled, then processing would then continue as normal, i.e., be transferred back to block 431 in a loop to possibly continue to check if the feature is enabled.

If the security measure is enabled, as determined in block 43 1, then an ID request may be sent to the network server, in block 433. An addition locality-based query may be periodically performed after boot, as well, at block 461. A wait loop is performed in blocks 435 and 437 to wait for a response, as discussed above for blocks 423 and 425. When the response is received by the network server, the ID is validated in block 439. If the ID is not valid for the location and/or network, as determined in block 441, then the platform may be forced into a lock-up mode, screensaver mode, or shutdown, based on platform policy, in block 443. If platform policy dictates a lock-up, standby, or screensaver mode, rather than a full shutdown, it will be apparent to one of skill in the art that a variety of options may be selected for continued processing. In an embodiment, it may be necessary to physically reboot the platform, for instance by holding the power button to force a reboot and restart the location-based checking from the boot phase. In another embodiment, polling of the location information and/or ID request may be performed periodically until the platform is brought into an authorized state. In another embodiment, a user may press a pre-defined key sequence to bring up a challenge-response to attempt a lock-down override. It will be understood that the method as shown in FIG. 4 is exemplary, and locality-based queries and identifier validations may be performed by polling, by interrupt or set periodically in a variety of temporal orders, based on platform policy, platform architecture or implementation.

If the ID is valid, either after the first try, or while already in lock-up mode, then the platform may be allowed to continue processing as usual at block 431. This loop reflects a periodic check to ensure that the platform identifier is authorized at the current location. In another embodiment, processing may continue at block 461 to perform another locality-based query.

However, if after n retries, the locality sensor fails to pick up a valid pre-programmed location, a variety of platform policy driver activities may be performed, in block 445. For instance, even if the ID is validated on the network, the platform may be out of an allowed range for location. Thus, the platform may be forced into lock-up, standby, shutdown, etc., and an alert may be sent to a network administrator. In an embodiment, processing may then continue to wait for more locality-based information in block 461.

In another embodiment, an additional check may be performed, in addition to the locality-based policies, to require a user to also have a known security device within proximity of the platform for both boot and runtime. The security device will have RF capabilities, either passive or active, to transmit, or allow access of the RFID or other identifier, to the platform RF received (103 or additional RF receiver/transceiver). In an embodiment, the existence of an authorized security device within range of the platform may supersede or obviate a challenged response, such as requiring a password or question/answer challenge. In another embodiment, even when the security device is in close proximity, the challenge may be required if the platform is not accessible to the authorized network, or in an authorized location.

Referring again to FIG. 4, the test for an RFID enabled security device may be inserted before the locality-based query (413 or 461) and/or before or instead of the forced challenge (409, 417 and 431).

A platform that is configured to utilize both locality-based information and RFID security devices may have either or both of these features turned on or off, selectively, based on platform policy.

Figure 5:
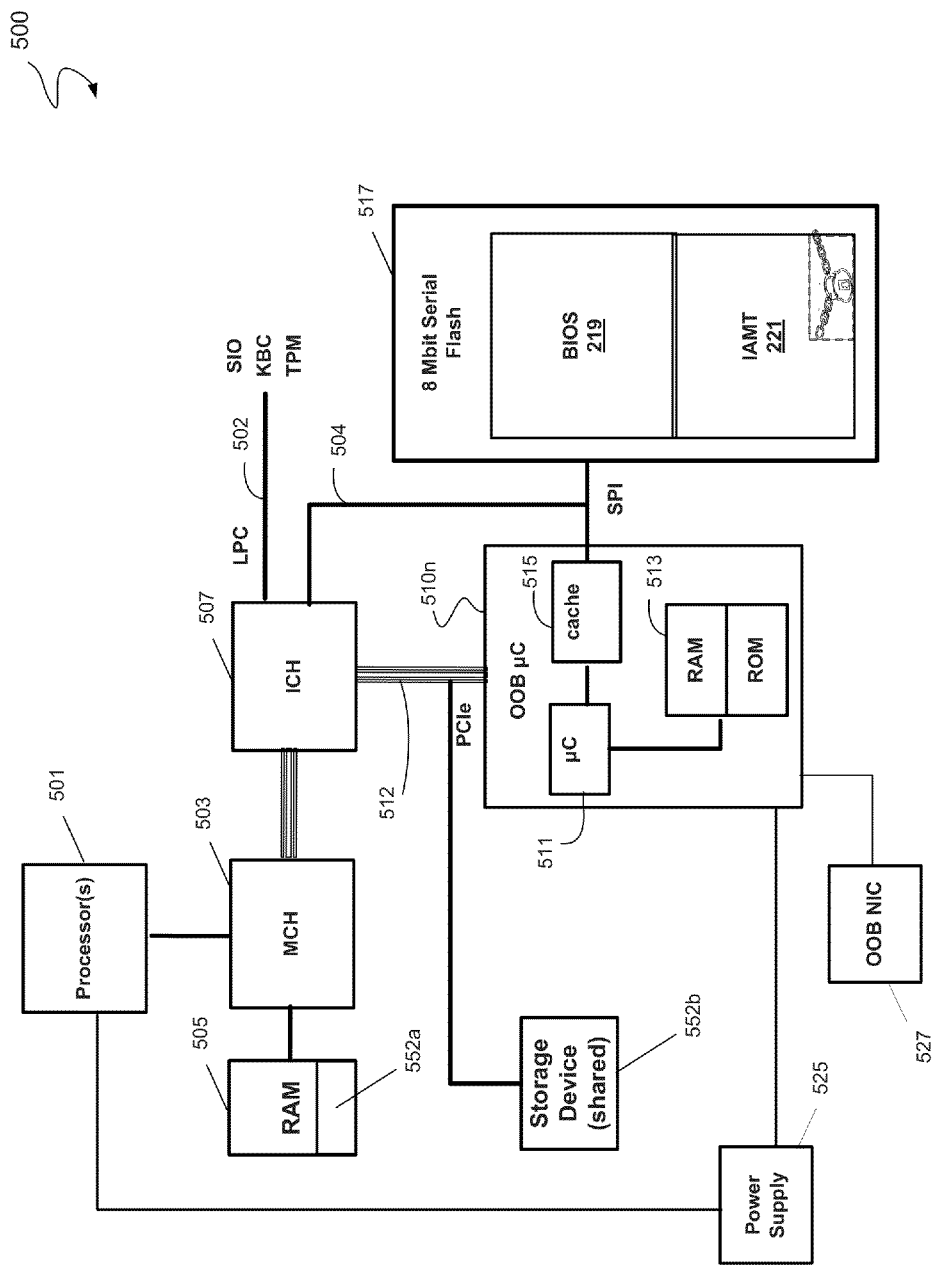
FIG. 5 is a block diagram illustrating an exemplary platform implementing the features disclosed herein, according to an embodiment of the invention.

FIG. 5 is a block diagram illustrating an exemplary platform implementing the features disclosed herein, according to an embodiment of the invention. A platform 500 comprises a processor 501. The processor 501 may be connected to random access memory 505 via a memory controller hub 503. Processor 501 may be any type of processor capable of executing software, such as a microprocessor, digital signal processor, microcontroller, or the like. Though FIG. 5 shows only one such processor 501, there may be one or more processors in the platform 500 and one or more of the processors may include multiple threads, multiple cores, or the like.

The processor 501 may be further connected to I/O devices via an input/output controller hub (ICH) 507. The ICH may be coupled to various devices, such as a super I/O controller (SIO), keyboard controller (KBC), or trusted platform module (TPM) via a low pin count (LPC) bus 502. The SIO, for instance, may have access to floppy drives or industry standard architecture (ISA) devices. In an embodiment, the ICH is coupled to non-volatile memory via a serial peripheral interface (SPI) bus 504. The non-volatile memory may be flash memory or static random access memory (SRAM), or the like. An out-of-band (OOB) microcontroller 510n (as in FIG. 1) may be present on the platform 500. The OOB microcontroller 510n may connect to the ICH via a bus 512, typically a peripheral component interconnect (PCI) or PCI express bus. The OOB microcontroller may also be coupled with the non-volatile memory store (NV store) 517 via the SPI bus 504. The NV store 517 may be flash memory or static RAM (SRAM), or the like. In many existing systems, the NV store is flash memory. It will be understood that various architectures may be used. For instance, a memory controller may be coupled directly to the processor, and/or the platform may have an IOH (input/output controller hub) rather than an ICH, etc.

The OOB microcontroller 510n may be likened to a "miniature" processor. Like a full capability processor, the OOB microcontroller has a processor unit 511 which may be operatively coupled to a cache memory 515, as well as RAM and ROM memory 513. The OOB microcontroller may have a built-in network interface 527 and independent connection to a power supply 525 to enable out-of-band communication even when the in-band processor 501 is not active.

In embodiments, the processor has a basic input output system (BIOS) 519 in the NV store 517. In other embodiments, the processor boots from a remote device (not shown) and the boot vector (pointer) resides in the BIOS portion 519 of the NV store 517. The OOB microcontroller 510n may have access to all of the contents of the NV store 517, including the BIOS portion 519 and a protected portion 521 of the non-volatile memory. In some embodiments, the protected portion 521 of memory may be secured with intel®( Active Management Technology (IAMT). In an embodiment, the portion 521 of the NV store is protected from access by the firmware based on chipset selections in a base address register (BAR).

Since the BIOS portion 519 of non-volatile memory may be modified by the OS or applications running within the OS, it is vulnerable to malicious tampering. The protected area of memory 521, available only to the OOB microcontroller, may be used to store critical boot vector information without risk of tampering. The only way to access the OOB microcontroller side of the NV store 517 is through verification via a proxy through the OOB microcontroller, i.e., signature authentication or the like. Embodiments of the present invention utilize a hardware protected region 521 of the non-volatile memory 517 and make the protected region inaccessible to the OS.

Many existing systems use the extensible firmware interface (EFI) and its associated flash variables. The EFI is a specification which defines a new model for the interface between operating systems and platform firmware, commonly known as Basic Input Output System (BIOS). The specification version 1.10, published Dec. 1, 2002, is available on the public Internet at URL www*intel*com/technology/efi/main_specification.htm. A unified EFI (UEFI) architecture may also be utilized. More information about UEFI may be found at www*uefi*org/specs/. In the EFI boot location specification, instead of wholly depending on pointers to a single boot location, a series of boot variables are used. The boot variables specify from which location the platform should boot. EFI systems store the boot variables in non-volatile memory, typically flash memory. This standard architecture is convenient for implementing embodiments of the present invention because the location of the boot variables is well defined.

In an embodiment, implementation of "mailboxes" to pass messages and data between the in-band (host processor communication) and out-of-band processor is according to techniques discussed in U.S. patent application Ser. No. 10/964, 355, entitled "BUS COMMUNICATION EMULATION" to Rothman et al. and filed on Oct. 12, 2004.

The OOB microcontroller 510n may be operated to store a "message" containing a directive in a memory shared by the OOB microcontroller 510n and a processor of the computer system such as the processor 501 of the host computer 500. In the illustrated embodiment, the host computer 500 includes a shared memory 552 which is accessible by both the processor 501 and the OOB microcontroller 510n. The shared memory 552 may reside in a reserved area of RAM 552a, or be located in a separate non-volatile memory store 552b, or the like. The shared memory may be operated as a mailbox for these messages. Thus, in one aspect, the OOB microcontroller 510n may store a message in the shared memory 552 or retrieve a message from the shared memory 552, independently of the status of the host computer 500 including the status of the processor 501, the operating system and the programs. Thus, in the illustrated embodiment, the OOB microcontroller 510n may store or retrieve messages in the shared memory 552 whether the Processor 501 is being initialized or is turned off, or whether the operating system is booting, running, crashed or otherwise.

To facilitate such independent operation, in this example, the controller 510n, the shared memory 552, the local bus 512 and other components as appropriate may be powered independently of the main components of the host computer 500 including the processor 501 and the host memory 505. The shared memory 552 may be non-volatile (NV) memory such as flash memory or static random access memory (SRAM). In embodiments described in more detail below, the OOB microcontroller 510n operates independently of the operating system or system start-up program, such that the OOB microcontroller 510n may have its own dedicated control circuitry, firmware, operating system, etc. to control the operations of the OOB microcontroller 510n independently of the status of the remainder of the host computer 500. It is appreciated that the degree of operational independence, if any, of the controller 510n and other components may vary, depending upon the particular application.

In an embodiment, during pre-boot, the security measures execute on the host processor 501. However, post-boot, the security measures and locality-based checks may execute on the OOB microcontroller 510n, for instance using IAMT. This partitioning of tasks allows the host processor to run more efficiently at runtime, without having to continually run firmware drivers and services to check the locality-based information. In this case, when a security measure fails, the microcontroller 510n may send the host BIOS a message to shutdown or lock-up, according to platform policy.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for protecting a computing platform from unauthorized access, comprising:
   a host processor coupled to a first wireless communication device to receive location-based information from a positioning device;
   an out-of-band processor different from and operating independently from the host processor, the out-of-band processor in communication with the host processor, coupled to the first wireless communication device to receive location-based information from the positioning device, and powered independently of the host processor to enable operation independent of the status of the host processor;
   a firmware service configured to run during boot on the host processor to verify that the computing platform is authorized for operation, the authorization based at least on location-based information received from the positioning device and pre-defined platform policy; and
   a runtime service configured to run after boot on the out-of-band processor independent of the status of the host processor, the runtime service configured to verify that the computing platform is authorized for operation, the authorization based at least on location-based information received from the positioning device and pre-defined platform policy;
   wherein when the computing platform is out of range of a location defined in the pre-defined platform policy, the runtime service is configured to send a message to the host processor through a shared memory accessible to the host processor and the out-of-band processor, the message to cause the host processor to perform a security function to inhibit operation of the platform.

2. The system as recited in claim 1, wherein the firmware service is configured to allow normal operation when the computing platform is within range of the location defined in the platform policy and an identifier associated with the computing platform is authenticated.

3. The system as recited in claim 2, wherein the firmware service is configured to prohibit the computing platform from completing the boot when the computing platform is out of range of the location defined in the platform policy or if the identifier associated with the computing platform is not authenticated.

4. The system as recited in claim 1, wherein the runtime service is configured to allow normal operation when the computing platform is within range of the location defined in the platform policy and an identifier associated with the computing platform is authenticated.

5. The system as recited in claim 4, wherein when the computing platform is out of range of the location defined in the platform policy or if the identifier associated with the computing platform not authenticated, the firmware service is configured to perform at least one of lock-up the computing platform, force the computing platform to execute a screen-saver, or shutdown the computing platform.

6. The system as recited in claim 1, wherein the computing platform is configured to send an alert when the computing platform fails authorization for operation.

7. The system as recited in claim 6, wherein the alert is to be sent by at least one of a network device coupled to the host processor or a network device coupled to the out-of-band processor.

8. The system as recited in claim 1, wherein the authorization is also based on detection that the computing platform is within a predefined range of at least one security device.

9. The system as recited in claim 8, wherein the security device comprises a physical device having either a passive or active radio frequency identifier known to the platform policy.

10. The system as recited in claim 1, wherein the location-based information includes an indicator as to whether the computing platform is within range of an authorized network.

11. The system as recited in claim 1, wherein the positioning device is a global positioning satellite system.

12. The system as recited in claim 1, wherein the positioning device is a local positioning system within range of the computing platform.

13. A method for protecting a computing platform from unauthorized access, comprising:
    receiving location-based information from a positioning device during both boot and runtime;
    determining whether the computing platform is within range of a pre-defined location, based on the received location-based information and a platform policy;
    transmitting a platform identifier to an ID Authenticator on a network server;
    receiving one of an authentication confirmation or authentication failure from the ID Authenticator;
    determining whether the computing platform is authorized to operate at a current location determined by the received location-based information, authentication confirmation or authentication failure of the platform identifier, and platform policy;
    when the computing platform is authorized to operate, allowing normal boot and runtime operation; and
    when the computing platform is not authorized to operate, based on platform policy and whether the computing platform is in boot mode or runtime mode, performing a security function including at least one of:
        prohibiting the computing platform to boot,
        locking-up the computing platform when in runtime,
        shutting down the computing platform when in runtime, and
        sending an alert that identifies failure to authorize the computing platform to operate normally;
    wherein determining whether the computing platform is authorized to operate is (i) is performed by a firmware service executed on a host processor on the computing platform during boot, (ii) is performed by a system service executed on an out-of-band processor on the computing platform independent of the status of the host processor during runtime, the out-of-band processor powered independently of the host processor to enable operation independent of the status of the host processor, and (iii) includes sending a message by the system service to the host processor through a shared memory accessible to the host processor and the out-of-band processor when the computing platform is not authorized to operate, the message to cause the host processor to perform the security function.

14. The method as recited in claim 13, wherein the host processor and out-of-band processor are coupled to separate network devices capable of independent communication to at least one network device.

15. The method as recited in claim 13, further comprising allowing normal boot operation when the computing platform is within range of a location defined in the computing platform policy and the platform ID is confirmed.

16. The method as recited in claim 15, further comprising prohibiting the computing platform from completing the boot when the computing platform is out of range of the location defined in the platform policy or if authentication failure from the ID Authenticator is received.

17. The method as recited in claim 13, further comprising allowing normal runtime operation when the computing platform is within range of a location defined in the platform policy and the platform ID authentication is confirmed.

18. The method recited in claim 17, further comprising performing at least one of locking-up the computing platform, forcing the computing platform to execute a screen-saver, or shutting down the computing platform when the computing platform is out of range of the location defined in the platform policy or when an authentication failure is received from the ID Authenticator.

19. The method as recited in claim 13, further comprising sending an alert to a network device when the computing platform fails authorization for operation.

20. The method as recited in claim 13, wherein determining whether the computing platform is authorized to operate at a current location further comprises:
    detecting proximity of at least one security device, wherein when the at least one security device fails to maintain proximity to the computing platform, then causing the authorization to be withdrawn or withheld, wherein the platform policy defines thresholds for proximity and authorized security devices.

21. The method as recited in claim 20, wherein the security device comprises a physical device having either passive or active radio frequency identifier known to the platform policy.

22. The method as recited in claim 13, wherein the location-based information includes an indicator as to whether the computing platform is within range of an authorized network.

23. The method as recited in claim 13, wherein the positioning device is a global positioning satellite system.

24. The method as recited in claim 13, wherein the positioning device is a local positioning system within range of the computing platform.

25. A non-transitory computer readable storage medium having instructions stored therein for protecting a computing platform from unauthorized access, the instructions when executed on at least one processor on the computing platform, cause the computing platform to:
    receive location-based information from a positioning device during both boot and runtime;
    determine whether the computing platform is within range of a pre-defined location, based on the received location-based information and a platform policy;
    transmit a platform identifier to an ID Authenticator on a network server;
    receive one of an authentication confirmation or authentication failure from the ID Authenticator;
    determine whether the computing platform is authorized to operate at a current location determined by the received location-based information, authentication confirmation or authentication failure of the platform identifier, and platform policy;
    when the computing platform is authorized to operate, allow normal boot and runtime operation; and
    when the computing platform is not authorized to operate, based on platform policy and whether the computing platform is in boot mode or runtime mode, perform a security function including at least one of:
        prohibit the computing platform to boot,
        lock-up the computing platform when in runtime,
        shut down the computing platform when in runtime, and
        send an alert that identifies failure to authorize the computing platform to operate normally;

wherein to determine whether the computing platform is authorized to operate (i) is performed by a firmware service executed on a host processor on the computing platform during boot, (ii) is performed by a system service executed on an out-of-band processor on the computing platform independent of the status of the host processor during runtime, the out-of-band processor powered independently of the host processor to enable operation independent of the status of the host processor, and (iii) includes to send a message by the system service to the host processor through a shared memory accessible to the host processor and the out-of-band processor when the computing platform is not authorized to operate, the message to cause the host processor to perform the security function.

26. The medium as recited in claim 25, wherein the host processor and second processor are coupled to separate network devices capable of independent communication to at least one network device.

27. The medium as recited in claim 25, further comprising instructions to allow normal boot operation when the computing platform is within range of a location defined in the platform policy and the platform ID is confirmed.

28. The medium as recited in claim 27, further comprising instructions to prohibit the computing platform from completing the boot when the computing platform is out of range of the location defined in the platform policy or if authentication failure from the ID Authenticator is received.

29. The medium as recited in claim 25, further comprising instructions to allow normal runtime operation when the computing platform is within range of a location defined in the platform policy and the platform ID authentication is confirmed.

30. The medium recited in claim 29, further comprising instructions to perform at least one of locking-up the computing platform, forcing the computing platform to execute a screensaver, or shutting down the computing platform when the computing platform is out of range of the location defined in the platform policy or when an authentication failure is received from the ID Authenticator.

31. The medium as recited in claim 25, further comprising instructions to sending an alert to a network device when the computing platform fails authorization for operation.

32. The medium as recited in claim 25, wherein determining whether the computing platform is authorized to operate at a current location further comprises instructions to:
   detect proximity of at least one security device, wherein when the at least one security device fails to maintain proximity to the computing platform, then cause the authorization to be withdrawn or withheld, wherein the platform policy defines thresholds for proximity and authorized security devices.

33. The medium as recited in claim 32, wherein the security device comprises a physical device having either passive or active radio frequency identifier known to the platform policy.

34. The medium as recited in claim 25, wherein the location-based information includes an indicator as to whether the computing platform is within range of an authorized network.

35. The method as recited in claim 25, wherein the positioning device is a global positioning satellite system.

36. The medium as recited in claim 25, wherein the positioning device is a local positioning system within range of the computing platform.

37. The system as recited in claim 8, wherein the security device comprises a biometric reader.

38. The system as recited in claim 1, wherein:
   the authorization is further based on detection that the computing platform is within a predefined range of at least one security device,
   the runtime service is configured to perform a first security operation in response to the computing platform being out of range of the location defined in the platform, and
   the runtime service is configured to perform a second security operation in response to the computing platform being out of range of the at least one security device, the second security operation different from the first security operation.

39. The medium as recited in claim 25, wherein the instructions further cause the computing platform to:
   perform a first security operation selected in response to the computing platform being out of range of the location defined in the platform policy,
   detect proximity of at least one security device, and
   perform a second security operation in response to the computing platform being out of range of the at least one security device, the second security operation being different from the first security operation.

40. The method as recited in claim 13, wherein determining whether the computing platform is within range of the predefined location comprises determining whether a signal power associated with the location-based information received from the positioning device is greater than a threshold power.

* * * * *